Aug. 6, 1940.                W. F. BERNSTEIN                2,210,748
                             OIL SEAL DIAPHRAGM
                             Filed June 26, 1939

Inventor:
Wilburn F. Bernstein
By Parkinson & Lane
Attorneys.

Patented Aug. 6, 1940

2,210,748

UNITED STATES PATENT OFFICE 2,210,748

OIL SEAL DIAPHRAGM

Wilburn F. Bernstein, Brookfield, Ill., assignor to Victor Manufacturing & Gasket Company, Chicago, Ill., a corporation of Illinois Application June 26, 1939, Serial No. 281,194

4 Claims. (Cl. 288—16)

The present invention relates to a novel oil seal diaphragm especially adapted for sealing the opening or space existing between relatively rotatable parts such as a shaft and its housing or surrounding structure. Although the invention is primarily directed to the diaphragm, it is to be understood that this diaphragm is mounted in a suitable retaining shell or casing which is securely mounted upon the shaft or its surrounding housing or structure, with the lip of the sealing element or diaphragm having a wiping contact with the shaft or surrounding housing, depending upon which element the retaining shell is mounted.

The novel diaphragm is composed of fiberized leather suitably treated to give it the desirable or necessary qualities to provide an effective seal against the escape or passage of lubricants water or other cooling fluids, as well as exclude dust or other foreign particles. A binder found suitable for the purpose and one giving excellent results is polymerized chloroprene or other so-called synthetic rubbers. This chloroprene binder gives sufficient flexibility to facilitate easy molding of the diaphragm, increases its resistance to oil and other fluids as well as increases the heat resisting properties of the fiberized leather base.

Further objects are to provide an oil seal diaphragm of maximum simplicity, economy, efficiency and ease of manufacture and assembly. By the use of scrap leather the cost of the diaphragm and oil seal are greatly reduced and the novel composition makes for a diaphragm which can be readily fabricated, and one which has all the qualities and advantages desired in an efficient oil seal diaphragm.

Figure 1:
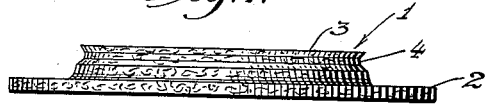
Fig. 1 is a view in end elevation of an oil seal diaphragm embodying the novel invention.
Figure 2:
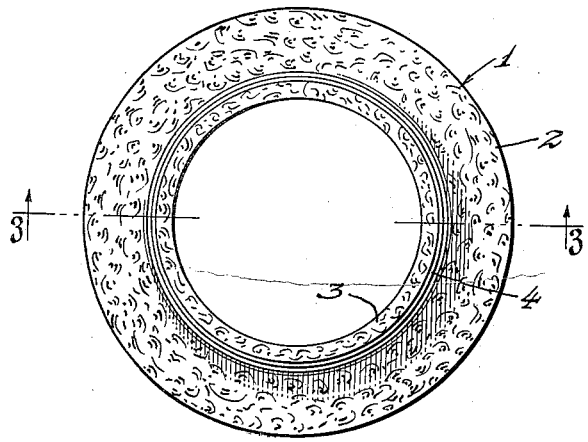
Fig. 2 is a plan view of the diaphragm.
Figure 3:
Fig. 3 is a view in horizontal cross-section taken on the line 3—3 of Fig. 2.

Referring more particularly to the disclosure in the drawing, the embodiment selected to illustrate the invention comprises an oil seal diaphragm 1 having an annular flange 2 adapted to be mounted and secured in a suitable retaining shell or casing, and which shell or casing is mounted in a housing or other structure surrounding a shaft. The annular lip 3 of the diaphragm is adapted to encompass the shaft and forms the shaft or surface engaging portion, which in the disclosed embodiment has a wiping contact with the shaft and thereby seals the annular space between the shaft and its surrounding housing.

Provision is made at 4 for the reception and retention of a garter spring or the like for maintaining the lip in wiping contact. The wiping surface of the diaphragm may also be loaded with graphite for reducing the friction of the sealing lip in its contact with a rotating shaft.

Although the illustrated embodiment is that of an internal seal, it will be evident that the diaphragm may be molded to provide an external seal and in which event, the retaining shell would be mounted on the shaft and the sealing lip has a wiping contact with the surrounding housing.

In the preparation of the leather fibres, scrap leather is fiberized as by means of a hammermill, and preferably passed through suitable screens of desired mesh to secure fibres of predetermined or desirable length. By fiberizing the leather is meant the reduction of this leather to a mass of substantially individual fibers.

The chloroprene polymer is preferably compounded with a suitable quantity of a retardant such as calcined magnesia, curing and vulcanizing agents such as wood rosin, zinc oxide and/or sulfur, and an anti-oxidant such as phenyl beta naphtha amine. These ingredients may be compounded into the cloroprene polymer in any of the many methods of compounding such materials which are well known in the art.

Fiberized leather is mixed with the compounded polymerized chloroprene and is sheeted in any of the conventional methods of forming a sheet. The sheet so produced is coated with or dipped in a flexible resin to more securely bond the leather particles and prevent their breaking loose on the surface causing the diaphragm to disintegrate.

The resins suitable for this purpose may be one of the many types of flexible resins well known to the trade such as flexible phenol or urea formaldehyde, alkyds, coumarones and the like. The diaphragm is molded from the sheets thus coated with flexible resin, and the resin provides a satisfactory surface finish.

The resultant product makes for an excellent oil seal diaphragm which is completely impervious to oil and water and which presents excellent frictional characteristics. As one example of the final oil seal diaphragm, such plastic composition seals have been composed of the following:

*Compounded chloroprene polymer*

| | Parts |
|---|---|
| Chloroprene polymer | 100 |
| Extra light calcined magnesia | 10 |
| Wood rosin | 5 |
| Agerite powder or phenyl beta naphtha amine | 1 |
| Sulfur | 1 |
| Zinc oxide | 10 |
| Fiberized leather | 150 |

However, the quantity of the ingredients, particularly those of the leather and chloroprene polymer, may be varied through a suitable range. Good results have been secured varying the amount of fiberized leather filler from 100 to 200 parts to 100 parts of the chloroprene polymer, with the other ingredients remaining in the proportions outlined above.

Having now described my invention, I claim:

1. An oil seal diaphragm composed of leather reduced to a mass of substantially individual fibers and compounded chloroprene polymer in the proportions of approximately one to two parts of leather to one part of chloroprene polymer.

2. An oil seal diaphragm comprising a base of leather reduced to a mass of substantially individual fibers bound by a chloroprene binder, the binder being in an amount sufficient to produce a diaphragm having greater flexibility than leather.

3. An oil seal diaphragm composed of leather reduced to a mass of substantially individual fibers and a flexible binder molded into the desired shape for sealing the space between relatively rotatable members, said binder being in an amount sufficient to produce a diaphragm having greater flexibility than leather.

4. An oil seal diaphragm provided with a flexible sealing lip adapted to form a wiping and sealing contact between a rotating shaft and its surrounding housing, said diaphragm being composed of leather reduced to a mass of substantially individual fibers and a flexible binder, the leather and binder being in the proportion of approximately one to two parts of leather to one part of binder.

WILBURN F. BERNSTEIN.